E. T. HOPE.

Elevators.

No. 5,556. Reissued August 26, 1873.

Witnesses:

C. Ebersmith

Charles Bulson

Inventor:

Erwin T. Hope

UNITED STATES PATENT OFFICE.

ERWIN T. HOPE, OF PHILADELPHIA, PENNSYLVANIA, ASSIGNOR TO SAMUEL I. THURSBY, OF BROOKLYN, NEW YORK.

IMPROVEMENT IN ELEVATORS.

Specification forming part of Letters Patent No. 81,276, dated August 18, 1868; reissue No. 5,556, dated August 26, 1873; application filed April 4, 1873.

*To all whom it may concern:*

Be it known that I, ERWIN T. HOPE, of the city and county of Philadelphia, in the State of Pennsylvania, have invented certain Improvements in Hydraulic Elevators, of which the following is a specification:

My invention relates to improvements in hydraulic apparatus for elevating platforms and passenger-carriages in buildings.

This apparatus consists of a series of tubes arranged telescopically, with suitable packing, so as to be capable of extension by the action of a fluid forced into them, and provided with stops to prevent the total withdrawal of one tube from the other, and containing a central plunger or piston, the upper end of which is secured to a horizontal platform, which moves in vertical ways, the ways serving not only to guide the platform or carriage, but to centralize the plunger and preserve the alignment of the tubing when extended. My invention embraces the application of cushions to prevent any shock when the tubes settle down together, and the combination with the apparatus of a three-way cock for admitting or discharging fluid to or from the tubes; and also includes a device for controlling the three-way cock, capable of being operated automatically by the platform at prescribed points, and also capable of being operated from the platform at any elevation, so that a person traveling thereon is enabled to govern the movement of the platform at pleasure.

Figure 1:
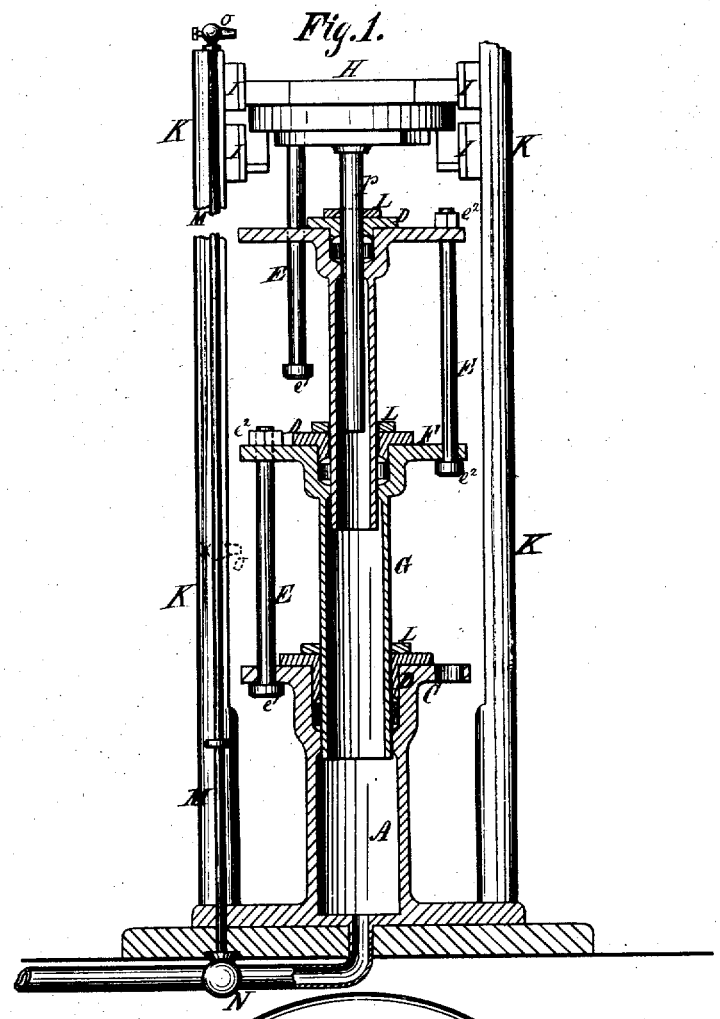
Figure 2:
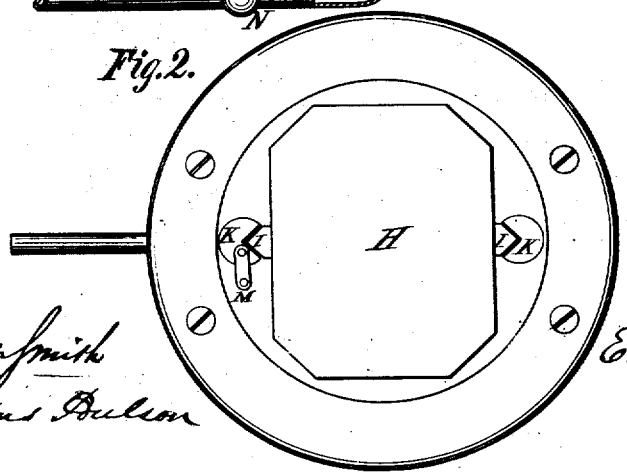

In the accompanying drawings, Figure 1 represents a vertical and partially sectional view of my improved apparatus, and Fig. 2 a plan of the same.

A represents a vertical stationary tube, provided with an enlarged base, which is firmly secured to a suitable bed. It is also provided with a flange, C, at the top, in which a stuffing-box, D, is fitted, and by which it is connected by the rod E to a similar flange, F, of a movable tube, G, which is fitted to work as a plunger within the tube A. Any suitable number of such tubes may be arranged, one within the other, to rise, one out of the other, by the action of fluid forced into them. The rods or bolts E are provided with heads, $e^1$, at one end and nuts, $e^2$, at the other end, to bear against the flanges when the tubes are fully extended, and thus operate as stops. The flange of the central tube or plunger *p* is secured to the horizontal platform H, provided with slides I, which work in the vertical ways K K. Thus the vertical ways K K, guiding the platform, extend a lateral support to the tubes, which tends to preserve their alignment. An annular spring or cushion, L, is arranged around each cylinder on the top of the stuffing-box D, for the purpose of preventing serious results from concussion when the tubes settle down together.

I also propose to provide similar springs between the heads of the rods E and the flanges of the tubes for the purpose of preventing concussion when the tubes are extended. Each succeeding tube should be made as much longer than the preceding one as the length of the stuffing-boxes, so that when they are retracted all the tubes will reach to the bottom of the fixed tube A; and they may be so arranged that when the fluid is introduced the lowest tubes will rise first, and the next succeeding; or the topmost may be moved first.

M represents a rod, connected at the bottom with a three-way cock, N, and running to the top of the ways, whereby the flow of fluid into the tubes for elevating the carriage may be stopped by persons on the carriage, or on any of the floors, and whereby the cock may be turned to allow the fluid to flow out for the purpose of allowing the carriage to descend. The rod M may be provided with arms *o o*, projecting into the path of the carriage and moved thereby, so that the cock N may be closed automatically by the carriage.

I claim as my invention devices in combination, substantially as described and for the purposes set forth, as follows, viz:

1. The combination of the cushions L L with the telescopic tubes.

2. The combination of the vertical ways K K, the platform H, the telescopic tubes, the three-way cock N, and the vertical rod M, with the arms *o o*, for governing the action of the fluid upon the tubes automatically at prescribed points.

ERWIN T. HOPE.

Witnesses:

ERASTUS POULSON,
C. EBER SMITH.